Figure 1:
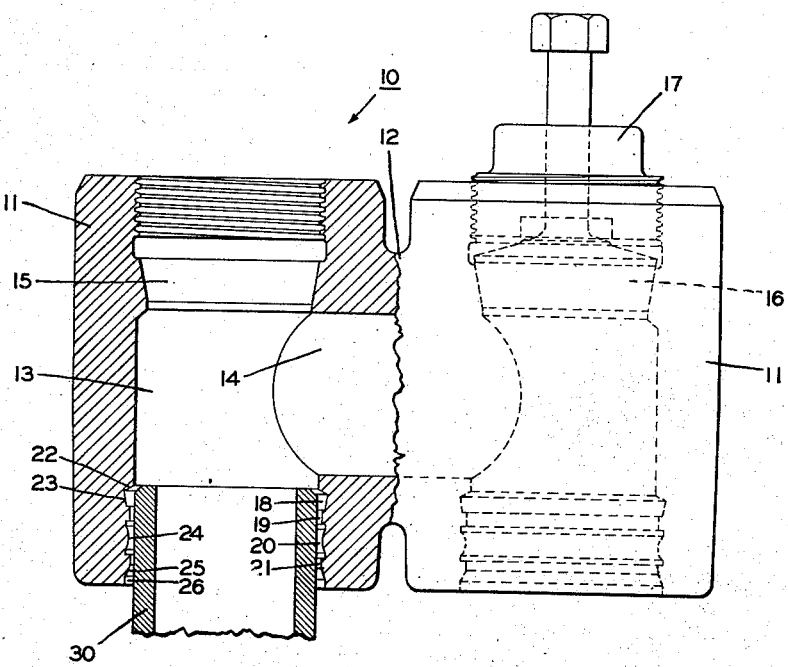

Aug. 12, 1941.   D. B. ROSSHEIM ET AL   2,252,274
TUBE CONNECTING DEVICE AND METHOD
Filed Sept. 7, 1938   2 Sheets-Sheet 1

INVENTORS
D. B. ROSSHEIM
A. R. C. MARKL
BY Virgil F. Davies
ATTORNEY

INVENTORS
D. B. ROSSHEIM
A. R. C. MARKL
BY Virgil F. Davies
ATTORNEY

Patented Aug. 12, 1941

2,252,274

UNITED STATES PATENT OFFICE 2,252,274

TUBE CONNECTING DEVICE AND METHOD

David B. Rossheim and Arthur R. C. Markl, Teaneck, N. J., assignors to The M. W. Kellogg Co., New York, N. Y., a corporation of Delaware Application September 7, 1938, Serial No. 228,758

4 Claims. (Cl. 29—157.5)

This invention relates to devices of the character employed for joining, or connecting the ends of two or more conduits, such as tubes, pipes and the like; in particular the invention relates to the formation of tight and strong joints in installations subjected to severe operating conditions.

It is common practice to unite the ends of conduits such as tubes, pipes and the like to connecting devices such as headers, return bends, tube sheets, fittings and the like, by rolling the ends of the conduits into holes having serrations in their walls. The resulting rolled joint is generally satisfactory in low and medium pressure installations. The prior art has not developed a rolled joint that is satisfactory in extremely high pressure installations and especially in installations where the extremely high pressure is coupled with extremely high temperature. Thus, in petroleum refineries and in particular in the cracking coils, transfer line exchangers and the like, where pressures as high as 2000 lbs. per square inch and temperatures well in excess of 1000° F. are not uncommon, the prior art rolled joint has not proved satisfactory. This is due in part to the fact that the prior art joints and the methods of rolling them make a tight, strong metal to metal contact throughout the joint area very difficult if not impossible to attain.

Because of the high temperatures employed the refinery art has quite generally adopted alloy tubes. These tubes are harder than the carbon steel tubes previously employed and sometimes closely approach the hardness of the metal of the connecting devices. This greatly enlarges the problem of securing a tight rolled joint since the hard alloy metal has more resistance to deformation and oftentimes, particularly when overrolling is resorted to for tightness, results in the spreading of the walls of the connecting devices.

With petroleum at the temperatures and pressure indicated a practically perfect seal must be obtained otherwise by reason of the coke formed in the imperfectly sealed regions there is always the possibility that the tube will eventually be swaged off its seat. To assure the necessary seal a deposit of weld metal at the tube end is often desirable but with the prior art forms of connecting devices and joints this becomes a very troublesome and expensive operation.

It is an object of this invention to provide a novel form of rolled joint, and a method for making it, especially suited for high temperature as well as high temperature—high pressure installations, that is characterized by a complete metal to metal contact between the tube and the connecting device throughout the whole zone of the joint.

It is also an object of this invention to provide a connecting device for tube ends which is provided with serrations of such character as to make a tight metal to metal joint throughout possible, the serrations also being such and so located that the tube ends are readily accessible for the deposition of sealing welds.

Figure 2:
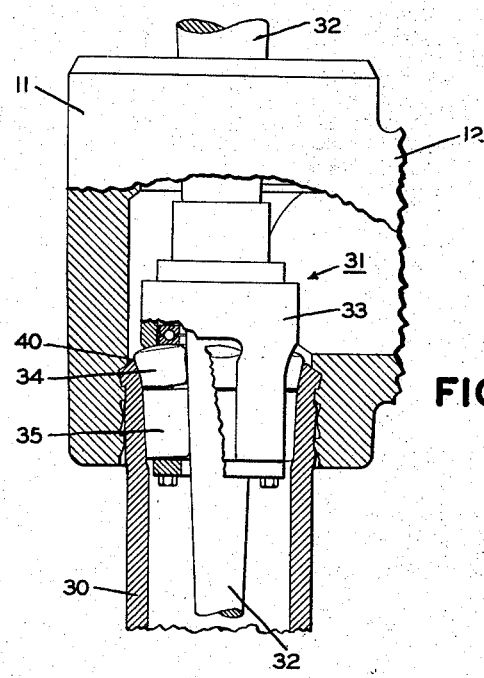
Figure 3:
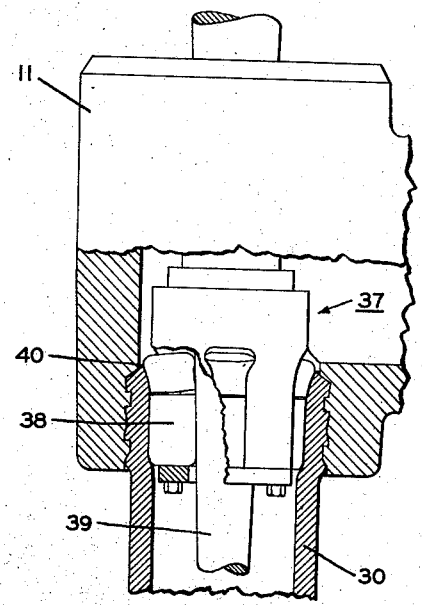
Figure 4:
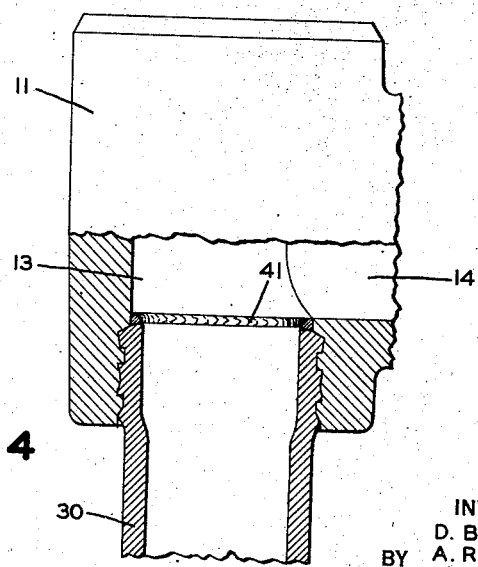

The above as well as the further objects and advantages of the invention will be readily apparent from a consideration of the following description of preferred embodiments and modes of carrying the invention out in practice, taken with the accompanying drawings, in which, Fig. 1 is a front view, partly in section, showing a header assembly prior to the tube rolling operations, Fig. 2 is a fragmentary sectional view of the assembly of Fig. 1 at the completion of the first of the rolling steps, Fig. 3 is a view similar to Fig. 2 at the end of the rolling operation, and Fig. 4 is also a view similar to Fig. 2 showing the completed joint with a seal weld deposited.

The invention is of general application and may be employed in the joining of the ends of conduits such as tubes, pipes and the like to connecting devices such as fittings, tube sheets, bends, headers and the like. For the purpose of this disclosure and without any intent to restriction or limitation, the invention will be described in connection with a cracking coil header and the expanding of the ends of furnace tubes into it.

The two hole cracking coil header 10 of Fig. 1 is made of a pair of tubular bodies 11 that are connected by crossover member 12. The passageways 13 of bodies 11 are connected by crossover passageway 14. Adjacent the upper end of each of bodies 11 is provided a plug seat 15 upon which is adapted to seat in fluid tight relation removable plug 16. Plug 16 is held on its seat by the pressure exerted through set collar 17 that screws into the top of body 11. Plug 16 is provided to make the inside of the header accessible for cleaning and other purposes.

Serrations are provided in the walls of bodies 11 below crossover passageway 14 for the reception of the ends of tubes 30. The serrations include a flare groove 18, a land 19, a main groove 20 and a land 21.

Flare groove 18 is formed by chamfers 22 and and 23 and the straight cut that forms the top of land 19. The intersection of chamfer 22 and the surface of passageway 13 forms a shoulder against which the tube metal is pressed during the rolling, as best shown in Figs. 2 and 3. The top shelf of land 19 forms a shoulder also. Lands 19 and 21 are of somewhat greater diameter than passageway 13 but their faces are parallel to the walls of the pasageway 13, hence the serrations are straight sided. Main groove 20 is composed of two straight end portions and an arcuate middle portion 24. The middle portion has been shown as arcuate but is not limited to this form, thus, it may be formed of one or more surfaces of such configuration that it will be higher, of less diameter, at its central portion than at its ends to provide what may be termed an anvil portion that will direct the tube metal toward the corners of the groove during the rolling operation.

The top shelf of land 21 forms a shoulder against which the tube metal is expanded during the rolling operations. The bottom face of land 21 is formed by a chamfer 25 that terminates in a flat cut 26. Chamfer 25 also forms a shoulder. Each of the five shoulders mentioned provides a region of close contact between the tube metal and the header body and assures both strength of joint and tightness of seal. Since only a minor portion of chamfer 25 is in contact with tube metal at the end of the rolling operation, see Fig. 3, the header metal from chamfer 25 to the bottom end of the header does not directly form part of the joint. However, this metal has been expressly provided to reenforce the joint metal of the header. By the provision of this reenforcing metal enlargement of the hole, especially when hard tubes are employed or overrolling is resorted to, is prevented and consequently, a stronger and tighter joint is obtained.

To form the rolled joint the ends of tubes 30 are inserted into the ends of passageways 13, as shown in Fig. 1. A tube expanding tool 31 is then passed through the plug hole of the header into the end of tube 30. Tool 31 may be of any preferred construction and as shown, includes a mandril 32, a roller cage 33, flaring rollers 34 and expanding rollers 35. While only one of both rollers 34 and 35 have been shown three or more of each are generally used. For this step of the rolling operation mandril 32 is tapered and rollers 35 formed with straight sides so that the taper of the mandril inclines rollers 35 to produce an inside tapered rolled tube end.

After insertion of tool 31 the air motor, or other similar means, is set in operation to rotate mandril 32, cage 33 and rollers 34 and 35. Rollers 34 and 35 will move outwardly as mandrel 32 moves down along the tube end 30 and expand the tube metal against the various shoulders and into grooves 18 and 20. Since the action of rollers 35 tends to cause an upward movement of the tube metal the combined action of rollers 34 and 35 result in the complete filling of groove 18 and a metal to metal contact throughout between the metal of the walls of the groove and the expanded tube metal. Rollers 35 as mandrel 32 moves them outwardly expand metal of tube 30 into groove 20. This expanded metal also moves outwardly and upwardly. Since the sides of groove 20 include arcuate portion 24 this portion will be the first to be contacted by the expanded metal. Curved portion 24 acts as an anvil-piece and by reason of its shape forces the expanded metal above its minimum diameter upwardly towards the top corner of groove 20 and the expanded metal below its minimum diameter downwardly towards the bottom corner of groove 20. Since lands 19 and 21 are straight sided and of substantially equal diameter the serration is straight sided, consequently, tool 31 cannot effect the full rolling required as it cannot deform the metal of tube 30 adjacent land 21 to the same extent as that adjacent land 19. Because of this a complete filling of the bottom corner of groove 18 is not obtained during this part of the rolling operation.

Thus, after tool 31 enters the end of tube 30 for the predetermined distance mandrel 32 is removed and a similar tool 37 is inserted. Tool 37 includes the same elements as tool 31 but its rollers 38, that correspond to rollers 35 of tool 31, are tapered to the same degree as mandril 31 but in the reverse direction so that they produce a rolled surface that is parallel to the walls of passageways 13.

As tool 39 is rotated the metal of tube 30 from the region of the bottom of the flare down is further expanded to give the tube end straight sides substantially parallel with the sides of passageway 13. During this portion of the operation the lower part of groove 18 and particularly the lower corner thereof is completely filled with tube metal so that a strong metal to metal contact is had throughout the joint area.

The rolling operation described cannot be successfully accomplished by use of tool 39 only. This is especially true of hard alloy tubes and still more true of tubes made of work hardenable material. In the first place the power requirements are too great and in the second place the tube ends as well as the rollers would be badly damaged.

Ordinarily the joint described is sufficient even in installations operating under the severest temperature but it is sometimes desirable to further assure a tight seal by depositing weld metal to unite the tube end to the header, as shown in Fig. 4. This is accomplished by inserting a fly-cutter or similar tool into passageway 13 to remove the upset portion 40 of the tube end and thus, form a welding groove into which weld metal 41 of desired analysis may be easily deposited to unite the tube end to the header. It is to be noted that there are no obstructions in the header to prevent the carrying on of the welding operation.

We claim:

1. In a connector body of the character described having a hole therein into which the end of a conduit is adapted to be expanded, a joint serration in the walls of said hole and concentric therewith, said serration including a flare groove at the end thereof furthest removed from the mouth of said hole, a land terminating said flare groove, a second land, a main groove between said lands, said lands having tube contacting surfaces of substantially equal diameter, said main groove having straight sides disposed normal to the axis of said hole and an arcuate floor of lesser diameter in the region of its middle portion than at its ends, the walls of said hole between said second land and the mouth being of greater diameter than said second land whereby tube metal does not substantially contact therewith after expansion and the body metal between said second land and said mouth serves to reenforce the body metal around the serration during expansion of the tube end.

2. In a connector of the character described having a hole therein into which the end of a conduit is adapted to be expanded, a joint serration formed in the walls of the hole, said serration including a main groove spaced from the ends of the hole, said main groove having straight sides disposed substantially normal to the axis of the hole, the bottom of said main groove being defined by a continuous arcuate surface extending substantially the full distance between said sides, said surface being such that said main groove is of minimum diameter in the region of its middle and of maximum diameter in the region of its ends, said main groove being concentric with said hole and of greater diameter throughout than said hole.

3. The method of forming a strong fluid tight joint between the end of a tube and a connector device in an apparatus installation designed for high pressure-high temperature service, the tube end being of a hardness approaching that of the connector device and the connector device having a tube receiving hole provided with a straight sided serration the main groove of which is defined by straight sides disposed normal to the axis of the hole and an arcuate floor that is of a minimum diameter in the middle region of the groove, which comprises, positioning the tube end in the tube hole, expanding the tube end on a line inclined to the axis of the tube to move tube metal into the main groove and to force the expanded metal to follow the contour of the groove toward the corners thereof, and further expanding the tube end on a line parallel to the axis of the tube to continue the radial and longitudinal movement of the metal expanded into the groove until the main groove and particularly the corners thereof are completely filled, said further expansion being carried out without substantial deformation of the tube hole.

4. In a connector, adapted for use in high pressure-high temperature installations, having a hole therein into which the end of a conduit is adapted to be expanded to form a strong fluid tight joint, a straight sided joint serration formed in the walls of said hole concentric therewith, said serration including a flare groove and a main groove separated from each other by a land of substantially uniform diameter, said flare groove having a side at said land disposed normal to the axis of the hole and an opposite side disposed at an acute angle to the axis of the hole, said sides being connected by a floor whose diameter constantly increases from said normally disposed side to said opposite side, said main groove having sides disposed normal to the axis of the hole, the bottom of said main groove being defined by a continuous arcuate surface of gentle slope extending substantially the full distance between said sides, said arcuate surface being such that said main groove is of minimum diameter at its middle and of maximum diameter at its ends.

DAVID B. ROSSHEIM.
ARTHUR R. C. MARKL.